(12) United States Patent
Buss

(10) Patent No.: US 8,301,901 B2
(45) Date of Patent: Oct. 30, 2012

(54) SYSTEM AND METHOD FOR EXPRESSING AND EVALUATING SIGNED REPUTATION ASSERTIONS

(75) Inventor: Duane Buss, West Mountain, UT (US)

(73) Assignee: EMC Corporation, Hopkinton, MA (US)

( * ) Notice: Subject to any disclaimer, the term of this patent is extended or adjusted under 35 U.S.C. 154(b) by 1056 days.

(21) Appl. No.: 11/682,783

(22) Filed: Mar. 6, 2007

(65) Prior Publication Data

US 2008/0222425 A1    Sep. 11, 2008

(51) Int. Cl.
*G06F 21/00*    (2006.01)
(52) U.S. Cl. .............. 713/185; 713/182; 726/2; 726/16; 726/17
(58) Field of Classification Search .................. 713/182, 713/185; 726/2, 16, 17
See application file for complete search history.

(56) References Cited

U.S. PATENT DOCUMENTS

| | | | | |
|---|---|---|---|---|
| 2003/0069839 | A1* | 4/2003 | Whittington et al. | 705/38 |
| 2003/0154401 | A1* | 8/2003 | Hartman et al. | 713/201 |
| 2004/0230522 | A1* | 11/2004 | Crosthwaite et al. | 705/38 |
| 2004/0260640 | A1* | 12/2004 | Crosthwaite et al. | 705/37 |
| 2005/0235153 | A1* | 10/2005 | Ikeda | 713/176 |
| 2006/0074836 | A1* | 4/2006 | Gardner et al. | 706/60 |
| 2007/0132342 | A1* | 6/2007 | Scott | 310/338 |
| 2007/0138260 | A1* | 6/2007 | Keys | 235/380 |
| 2007/0162464 | A1* | 7/2007 | Rieffanaugh, Jr. | 707/10 |
| 2007/0245145 | A1* | 10/2007 | Nishiyama | 713/176 |
| 2007/0288375 | A1* | 12/2007 | Talbert et al. | 705/44 |

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrived from the internet: <URL:http://web.archive.org/web/20020210124615/www.abanet.org/scitech/ec/isc/dsg-tutorial.html; pp. 1-8.*
"Writing a Better Resume—A Better Resume for the Job Candidate", Resumefit, www.resumefit.com/resumecandidateresumefit.html, pp. 1-2.
"Resume Writing & Resume Sourcing Solution—Science and Technology", Resumefit, www.resumefit.com/resumescience.html, pp. 1-2.
"Resume Writing & Resume Sourcing Solution—Digital Signature Technology", Resumefit, www.resumefit.com/resumedigital.html, pp. 1-2.
Schmidt, T., "The Problem of Identifying Candidate Quality", Resumefit, www.resumefit.com/resumebigfive.html, pp. 1-4.
"The Resumefit Resume—Frequently Asked Questions", Resumefit, www.resumefit.com/resumecandidatefaq.html, pp. 1-2.

(Continued)

*Primary Examiner* — Edan Orgad
*Assistant Examiner* — Bradley Holder
(74) *Attorney, Agent, or Firm* — Barry N. Young

(57) ABSTRACT

A method for expressing and evaluating signed reputation assertions is disclosed. In one embodiment, a first entity receives a request to generate a signed assertion relating to a piece of content. The first entity generates a reputation statement about a second entity from reputation-forming information (RFI) about the second entity available to the first entity. The first entity then generates a signed assertion from the reputation statement and the piece of content at least in part by binding the piece of content to the reputation statement and signing a portion encompassing at least one of the bound piece of content and the bound reputation statement. The signed assertion is then transmitted to a receiving entity.

20 Claims, 3 Drawing Sheets

OTHER PUBLICATIONS

"Resumefit LLC/Right Fit. Right Hire.", Resumefit LLC, www.resumefit.typepad.com, pp. 1-4.
"Yahoo! Anti-Spam Resource Center—Domain Keys", Yahoo! Mail, http://antispam.yahoo.com/domainkeys, pp. 1-8.
"Random Reputation Ramblings", Phil Windley's Technometria—Random Reputation Ramblings, http://www.windley.com/archives/2007/03/random_reputation_ramblings.shtml, pp. 1-5.
"Internet Identity—Reputation Networks and more", http://blog.joeandrieu.com/2006/12/03/internet-identity-reputation-networks-and-more/, pp. 1-4.
"Privacy Issues—From Project VRM", http://cyber.law.harvard.edu/projectvrm/Privacy_issues, pp. 1-2.
"Harness the power of Reputation", iKarma, Inc., iKarma.com.
"The Alpha Gorb", The GORB, thegorb.com, pp. 1-7.
"What is Rapleaf?", RapLeaf, rapleaf.com.
"Microsoft's Vision for an Identity Metasystem", Microsoft Corporation, May 2005, http://www.identityblog.com/stories/2005/07/05/IdentityMetasystem.htm, pp. 1-10.
Windows CardSpace (formerly "InfoCard"), Microsoft Corporation 2007, http://msdn2.microsoft.com/en-us/netframework/aa663320.aspx, pp. 1-2.
"GNOME Keyring", Wikipedia, the free encyclopedia, http://en.wikipedia.org/wiki/GNOME_Keyring, pp. 1-2.
Staikos, et al., "The KWallet Handbook" The KWallet Handbook, http://docs.kde.org/stable/en/kdeutils/kwallet/index.html, pp. 1-12.
"RoboForm—remembers passwords so you don't have to", RoboForm, http://www.roboform.com/.
"Sxipper- Beta", Sxip Identity Corporation, http://www.sxipper.com/.
"Google Toolbar for Firefox", Google 2007, http://www.google.com/tools/firefox/toolbar/FT3/intl/en/index.html?utm_campaign=en&utm_source=en-ha-na-us-google&utm_medium=ha&utm_term=toolbar%20google&tbbrand=GFRG.
"Norton Confidential Bata—Frequently Asked Questions", Symantec Corp., http://www.symantec.com/home_homeoffice/transactsafely/ncobetafaq.jsp, pp. 1-3.
Edelman, B. et al., "Adverse Selection in Online 'Trust' Certifications", Sep. 6, 2006 Draft, pp. 1-35.
"SAML", Wikipedia, the free encyclopedia, http://en.wikipedia.org/wiki/SAML, pp. 1-11.
"Differences Between OASIS Security Assertion Markup Language (SAML) V1.1 and V1.0", OASIS Open, Prateek Mishra Editor, May 21, 2003, http://www.oasis-open.org/committees/download.php/3412/sstc-saml-diff-1.1-draft-01.pdf, pp. 1-6.
"Welcome to the Better Business Bureau", Better Business Bureau (BBB), http://www.thelocalbbb.org/members/programs.html, pp. 1-2.
"How Do You Make Sense of Web-Based Seals?", TRUSTe—Make Privacy Your Choice, http://www.truste.org/articles/seals_comparison.php, pp. 1-3.
"Privacy-Enhancing Cryptography", IBM Zurich Research Laboratory, http://www.zurich.ibm.com/security/privacy/, pp. 1-3.
"Why Choose Cybertrust", Cybertrust 2007, www.cybertrust.com, pp. 1-2.

* cited by examiner

SYSTEM AND METHOD FOR EXPRESSING AND EVALUATING SIGNED REPUTATION ASSERTIONS

CROSS-REFERENCE TO RELATED APPLICATION

The disclosure of co-pending application Ser. No. 11/625,663, System and Method for Implementing an Extended Credential Store, filed Jan. 22, 2007, is incorporated herein by reference in its entirety.

BACKGROUND

There is growing concern among individuals in the United States and abroad about identity theft as well as the misuse of personal information. At the same time, businesses are increasingly concerned about fraud and theft. The increasing automation of business transactions has removed many of the cues people use to make judgments about the trustworthiness of those they deal with. Further, the same automation that increases the scope of risky transactions also increases the possible scale of losses; unauthorized or fraudulent transactions can occur more quickly and in more places than before.

Nevertheless, the "looseness" of the current system can also be considered a feature. The same transaction speed that magnifies losses in the event of fraud also magnifies gains in legitimate transactions. Speed and convenience are selling points for each wave of automation—and for most individuals and businesses, the gains have been substantial enough to outweigh the increased risks and the occasional losses.

One way to reduce the chance of losses is to use a reputation-based system. Many examples of these systems exist. For example, an individual's credit rating is a numerical "reputation" by the credit agency concerning that individual's financial condition and past payments on debt. A business may use a Better Business Bureau or TRUSTe seal to make assurances to consumers about the reputation of the company and the security with which customer's data is handled.

SUMMARY

In one embodiment, a method for expressing and evaluating signed reputation assertions is disclosed. In this method, a first entity receives a request to generate a signed assertion relating to a piece of content. The first entity generates a reputation statement about a second entity from reputation-forming information (RFI) associated with the second entity. The first entity then generates a signed assertion from the reputation statement and the piece of content at least in part by binding the piece of content to the reputation statement and signing a portion encompassing at least one of the bound piece of content and the bound reputation statement. The signed assertion is then transmitted to a receiving entity.

DETAILED DESCRIPTION

Figure 1:
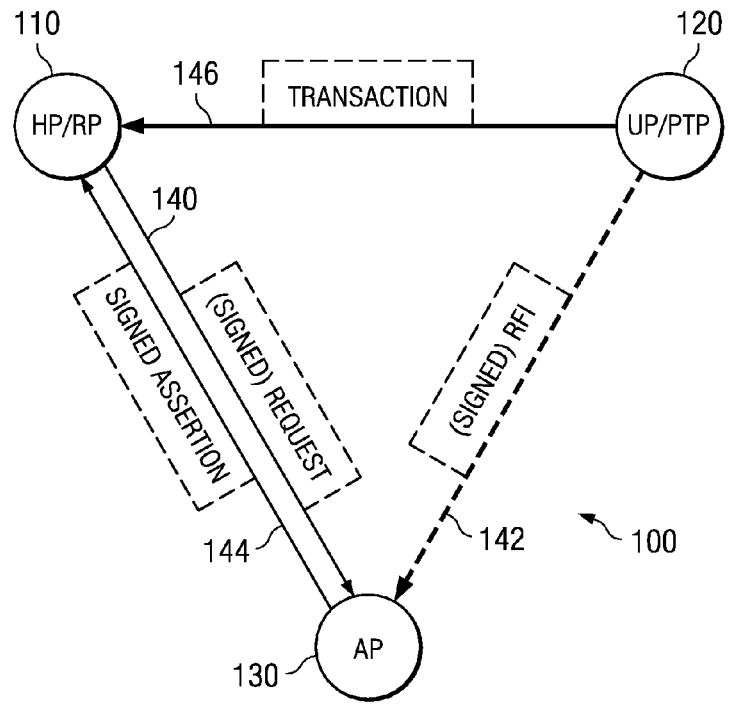
FIG. 1 is a diagram of a signed assertion system in accordance with one embodiment.

A reputation-based system can be modeled as a process in which one or more of the primary parties in a transaction include in the process an assertion by a third party concerning some matter of interest. However, many different types of reputation transactions are possible, and in each situation, different entities may fulfill more than one role. In a typical situation, there are entities that wish to engage in a transaction, which are referred to as the (prospectively) transacting parties (TP). One or more of the TPs is a hesitant party (HP) because one of the other TPs is an unknown or unverified party (UP). However, the unknown party UP has a relationship to a third party, the asserting party (AP). The AP can provide an assertion, defined herein as one or more statements of fact or opinion concerning the UP, because the AP is in possession of reputation-forming information (RFI) from or about the UP. A requesting party, or requester, requests the assertion, and a providing party, or provider, provides it. One or more of the HPs can accept the assertion and become relying parties (RPs), possibly transforming UPs into provisionally trusted parties (PTPs). Upon receipt of the assertion, each RP evaluates the assertion. This evaluation may involve using the assertion directly as an input to the transaction (for example, continuing with the transaction, modifying the transaction, or aborting the transaction), or by processing the assertion to create an intermediate result (for example, a confidence estimate, applicability score, or strength value), which intermediate result is then used as an input to the transaction. Finally, any role can also be fulfilled through the use of an agent or proxy.

The roles described above are not mutually exclusive; in any given transaction, a party may fulfill any or all of these roles simultaneously or in turn. Several exemplary model reputation cycles will serve to illustrate different arrangements. Not all possible reputation cycles are described, and more than one model can be active at the same time in the same transaction. The reputation cycles described below are merely exemplary and are not meant to be limiting.

Various embodiments will be apparent to those skilled in the art. For example, some embodiments may allow a product or service to act as a reputation proxy for the manufacturer or service provider. For example, a car maker's reputation is at least in part due to the reputation of each car and car line. The reputation data exchanged in a particular transaction may be segmented—for example, by product—to better refer to one aspect of a larger, more complex reputation. Similarly, a manufacturer or service provider may use its own reputation as a proxy for a product. For example, if a new product with no particular reputation is launched into the market, the provider of that product may substitute its own reputation for the nonexistent product reputation.

In another contemplated embodiment, multiple actors can cooperate to provide, exchange, or leverage reputation data. Using the manufacturer-reputation-as-proxy embodiment described above, different sub-suppliers can individually contribute to the reputation. For example, each part manufacturer could have a share in the proxy reputation, as could quality-assurance labs and reviewers. Failures in the product—and subsequent reputation damage—would be apportioned between the joint reputation providers. These and other embodiments, some of which are described below, are contemplated and inherent in the concepts described.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In another embodiment, one or more of the modules are implemented in software for execution by various types of processors. An identified module of executable code may, for instance, comprise one or more physical or logical blocks of computer instructions that may, for instance, be organized as an object, procedure, or function. Further, the executables of an identified module need not be physically located together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, merely as electronic signals on a system or network.

Another embodiment uses higher-level components as modules. For example, one module may comprise an entire computer acting as a network node. Another module may consist of an off-the-shelf or custom program, such as a database management system. These higher-level modules may be decomposable into smaller hardware or software modules corresponding to different parts of a software program and identifiable chips (such as memory chips, ASICs, or a CPU) within a computer.

One special type of module is a "network." A network module defines a communications path between endpoints and may comprise an arbitrary amount of intermediate modules. A network module can encompass various pieces of hardware, such as cables, routers, and modems, as well the software necessary to use that hardware. Another network module encompasses system calls or device-specific mechanisms such as shared memory, pipes, or system messaging services. A third network module uses calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

What constitutes a "party" or an "entity" may vary between embodiments. In one embodiment, the parties are people interacting with the system. In another embodiment, the parties are different systems that need to interact in an arm's-length transaction. A third embodiment uses computing modules as parties. A fourth embodiment uses more than one type of entity in the same transaction.

The implementation of "sending" or "transmitting" reputation data (assertions, RFI, or other information) varies between embodiments. For example, one embodiment uses XML-formatted textual protocols such as SOAP, SAML, or XML-RPC to send reputation data. Another embodiment uses a free-form textual protocol. A third embodiment uses a binary protocol such as COM, CORBA/IIOP, or an object serialization scheme like Java RMI. One particular embodiment associates reputation information with identities, and uses proxies or protocols such as OpenID URIs, SXIP identities, InfoCards, LDAP, etc.

Various embodiments may "evaluate" assertions differently as well. For example, one embodiment evaluates an assertion by using an operator-presentation model. In this model, the assertion(s) are processed sufficiently to present them to an operator; the operator's response is communicated back into the system by means of a graphical or textual user interface. Another embodiment uses a computing module to evaluate an assertion based upon a predefined interpretation model. A third embodiment evaluates an assertion by using the assertion as an input to a function. A fourth embodiment evaluates an assertion by classifying the assertion using a genetic algorithm or neural net. Other types of evaluation are contemplated; various specific embodiments of evaluation functionality will be disclosed in connection with specific embodiments. Not all types of assertions will be appropriate for all types of evaluation; in general, the more structured the assertion, the more amenable it will be to automated processing. However, the use of unstructured assertions is also contemplated.

FIG. 1 illustrates a model reputation cycle 100 in accordance with one embodiment. A first entity 110 and a second entity 120 are TPs. The first entity 110 is an HP; the second entity 120 is a UP. The HP 110 acts as a requester by contacting a third party 130 and requesting an assertion, as represented by an arrow 140. In some embodiments, the assertion request is signed. The UP 120 has either a) previously given, or b) contemporaneously with the assertion request gives RFI to the third party 130, as represented by an arrow 142. In some embodiments, the RFI is signed. The third party 130 acts as an AP by using the RFI received from the UP 120 to form an assertion. The third party 130 then acts as a provider by sending a signed assertion to the HP 110, as represented by an arrow 144. After evaluating the signed assertion, the HP may become an RP, the UP may become a PTP, and the transaction proceeds using the assertion as an input, as represented by an arrow 146.

The embodiment described above keeps the assertion request 140 and the RFI 142 conceptually separate; in some embodiments, the assertion request 140 and the RFI 142 may be joined. In one embodiment, the UP 120 specifies the content that should be bound, any additional statements requested, and any delivery or content restrictions that should be imposed. The RFI 142 is structured or unstructured information which the AP can use to form an opinion or make an assertion about a party. This information can be numeric, tagged, binary, free-form, or in some other format. Semantically, the assertion request 140 is about the assertion; the RFI 142 is about the UP/PTP 120.

The reputation cycle model 100 has many implications. In this example, as in others, evaluation of the assertion by the HP 110 may not transform the UP 120 into a PTP. The assertion may be negative in effect, transforming an unverified or unknown party into an untrusted party, causing the transaction to be aborted. The assertion still functions as an input to the transaction, however, even if the effect is to abort the transaction entirely. More commonly, the UP becomes a PTP to some degree. In some cases, the effect of the assertion may be to allow the transaction to go ahead unhindered. In other cases, the effect of the assertion may be to modify the transaction. For example, the relying party may make the terms of the transaction more or less favorable according to how the received assertion affects a projected risk model, profitability estimate, or other criteria. Further examples of the reputation cycle will assume that the transaction is modified or approved, even though other outcomes are also contemplated.

Another implication of the transition from UP to PTP (or untrusted party) is that reputation is distinct from trust. Reputation can be one of the factors upon which trust is based, but reputation-based confidence can also be orthogonal to trust relationships. The evaluation of one or more signed assertions may engender more confidence than an unsigned assertion or no assertion, but accepting one or more signed assertions does not necessarily imply an extension to a web of trust.

A further implication of this model is that reputation is rooted in identity. However, those skilled in the art will appreciate that the concept of an "identity" is broader than a simple authenticated identity; an identity may be anonymous, pseudonymous, or part of a group. One embodiment, for example, uses a cryptographic protocol wherein different systems know entities only by pseudonyms. Each entity can hold multiple pseudonyms, and different pseudonyms of the same entity cannot be linked. However, a system can issue a credential to a pseudonym, and the corresponding entity can prove possession of that credential to another system (who knows that entity by a different pseudonym), without revealing anything more than the possession of the credential. Any identity protocol known in the art may be used. Other embodiments use other protocols that allow, for example, revocable anonymity, individual anonymity within an identified group, and "confirmed" identity (a protocol where a semi-trusted third party is required to confirm a particular signature). Other factors may also be used, such as a possession-based identity (for smart cards, PINs, etc.) and biometric-based identity.

It is appreciated that reputation information, including assertions and RFI, can be complex. For example, RFI may come from prior transactions, personal or institutional knowledge, numerical analysis, paid relationships, group associations, etc. An assertion may include some, all, or none of the supporting RFI, and the format of RFI may be transformed for different consumers. It is appreciated that different embodiment may use different forms of RFI with differing levels of formality. For example, one embodiment uses a defined XML vocabulary to precisely define certain terms; adherence to the vocabulary is necessary for information to be considered valid. Enforcement of the vocabulary is accomplished by using a validating parser to evaluate both RFI and final assertions. Another embodiment can use mixed structured and unstructured content. For example, in one embodiment sports fans create and distribute RFI and assertions about athletes. This information comprises structured statistics as well as unstructured commentary and analysis. A third embodiment uses multiple RFI providers or asserters and bundles them into a single assertion. Continuing the sports fan example, the statistics could be provided by the league or team; the fan could provide the commentary and analysis. A fourth embodiment uses only free-form RFI and assertions. For example, a sewing interest group may give impressions and feedback about various designs and designers without using any formally defined schema. Other embodiments may use different levels of structure at different points in the reputation cycle. Unstructured assertions may be more suitable for interactive (human-based) evaluation, while structured assertions and structured RFI data may be more suitable for machine evaluation.

Given these various contexts, there is no inherent limit on the information that can be bound with content. For example, various embodiments can include reputation information structured as boolean values, strings, histories, dates, date ranges, associative arrays, lists, or sets. This information can be free-form or embedded within a binary protocol or another structured format such as XML. One embodiment, for example, uses XML-RPC or SOAP to format and package arbitrary data. Evaluation is accomplished via parsing the data and using rules or functions to process the data contained therein. Another embodiment uses domain-specific formats, such as HDF; evaluation is accomplished using a module that uses the domain-specific format. A third embodiment uses S-Expressions to define both data and directives. Evaluation of the S-Expressions uses a Read-Eval-Print (REPR) loop; various macros may be defined that transform parts of the directives or data in arbitrary ways. A fourth embodiment uses one or more computing modules to maintain the data. For example, the information may be stored in tables using an embeddable database module; a serialization format allows the transmission of database content across the wire. Evaluation is accomplished via creating or updating an in-memory database image and querying the database for values. A fifth embodiment mixes several formats and types of evaluation in the same cycle. A sixth embodiment uses a format that is self-identifying as to the type of reputation data provided and its structure.

Further, there is no particular requirement that only reputation information be bound with a particular piece of content. Other embodiments may embed other restrictions or pieces of information within a signed assertion. In one embodiment, a signed assertion from "upstream" is incorporated in whole or in part into the current assertion. In another embodiment, these other restrictions may affect guarantees made by the AP. For example, one embodiment embeds restrictions concerning the delivery of the larger incorporating assertion. These restrictions, translated into English, can include statements such as "this assertion must be delivered over a channel encrypted via SSL," "this assertion must be delivered from [URI]," "this assertion is only valid within 12 hours of [date/time]," and "this assertion must be confirmed by the confirming authority at [URI]." Other assertions specify the context of the request. One embodiment accomplishes this by extending a SAML assertion with new conditions and expressions. The interpretation of the new conditions and expressions is controlled by a publicly accessible schema. Possible conditions and expressions include "DeliveryRestriction," "RetrievedFrom," "PathContext," etc. Clients are able to interpret these directives according to the schema and so receive meaningful information about outside information relevant to a particular assertion. This allows signed assertions to be read and processed in other contexts without creating the possibility of unauthorized reuse. For example, in one embodiment a web security auditor provides signed assertions about the security of a particular audited site. As part of those assertions, the auditor includes the delivery restriction that the assertion is only valid if it is retrieved from the domain associated with the site being audited, and if it is being retrieved with the content to which it has been bound.

It is also contemplated that assertions, reputation information, and other statements will be provided in alternate forms. For example, one embodiment uses a proprietary assertion language. A second embodiment provides the information in a raw form, with all processing done on by the HP/RP. A third embodiment provides anonymized, collated, or otherwise processed information.

In some embodiments, one or more parts of a reputation are numerically defined. For example, one embodiment evaluates reputation data using the function $$R_{UP}=F(R_{AP},S(A_{RFI})),$$

where R is reputation, UP is the unknown party, AP is the asserting party, S is the strength of an assertion, and RFI is the reputation-forming information giving rise to that assertion. Although this reputation is calculated, it the result may not be a single number. For example, one embodiment could return a vector of values. Other embodiments include a trust value between the HP and AP or different values based on the type of assertion.

In another embodiment, the strength of a reputation or an assertion is evaluated using a "web of confidence" model. In one embodiment of this model, reputation connections are considered as edges in a graph. The minimum distance between two nodes (parties) is calculated, using the inverse of previously defined confidence levels as the traversal cost, with a minimum confidence threshold being interpreted as a maximum traversal cost. This may be applied to APs or UPs. If the transitive confidence is sufficient to transform the HP into an RP, the transaction proceeds. The results of that transaction, as well as the consequent increase or decrease in confidence, can then affect the web of confidence using a back-propagation model.

In another embodiment, a community-connectedness model is used to evaluate the strength of an assertion or a reputation. This model uses social network analysis to weight assertions based upon the degrees of connectedness between the UP and some other set of parties. Assertions concerning highly-connected UPs can be more confidence-generating.

In another embodiment, a reputation provider uses a reputation-feedback model. Reputation consumers (RPs) are given a specific method by which they can rate the reputation they received. The AP receiving the feedback uses the feedback to modify its sources of RFI. In some cases, the reputation of the AP itself may be affected and subsequent HPs may not give the same weight to assertions signed or provided by that AP. In another embodiment, the reputation-feedback model is used to enable centralized reporting of RFI. It is frequently desirable to provide mechanisms for reputation information to stay current. In cases where reputation information about a particular entity is provided from multiple locations, one statement bound with the signed data includes a centralized location to report new RFI.

Some portions of the reputation cycle are described as "signed." What constitutes an adequate signature can vary between embodiments, as can the method of signing. Any signing protocol known in the art can be used, but the strength and quality of the guarantees made by the different signing protocols may vary. In general, the adequacy of a given signing method varies according to the ontology of the information provided. For example, one embodiment uses public/private key signing to make certain guarantees about the identities of the various parties, as described above. Another embodiment uses a one-way hash to make guarantees about some piece of content. For example, one embodiment uses a secure date time stamping algorithm to indicate the last time a certain piece of content was changed. Another embodiment uses a cryptographic signature to guard against later changes in some piece of content. A third embodiment uses a public/private key infrastructure to guarantee that a particular person created or distributed a particular piece of content. A fourth embodiment uses a computing module to provide key generation, random number generation, or signing services. In general, an embodiment may use a signing protocol to bind an arbitrary assertion to a piece of content. Further embodiments mix multiple signing protocols within the same cycle. An evaluation function may take the signing protocol into account when determining the overall value to assign to an assertion.

Figure 2:
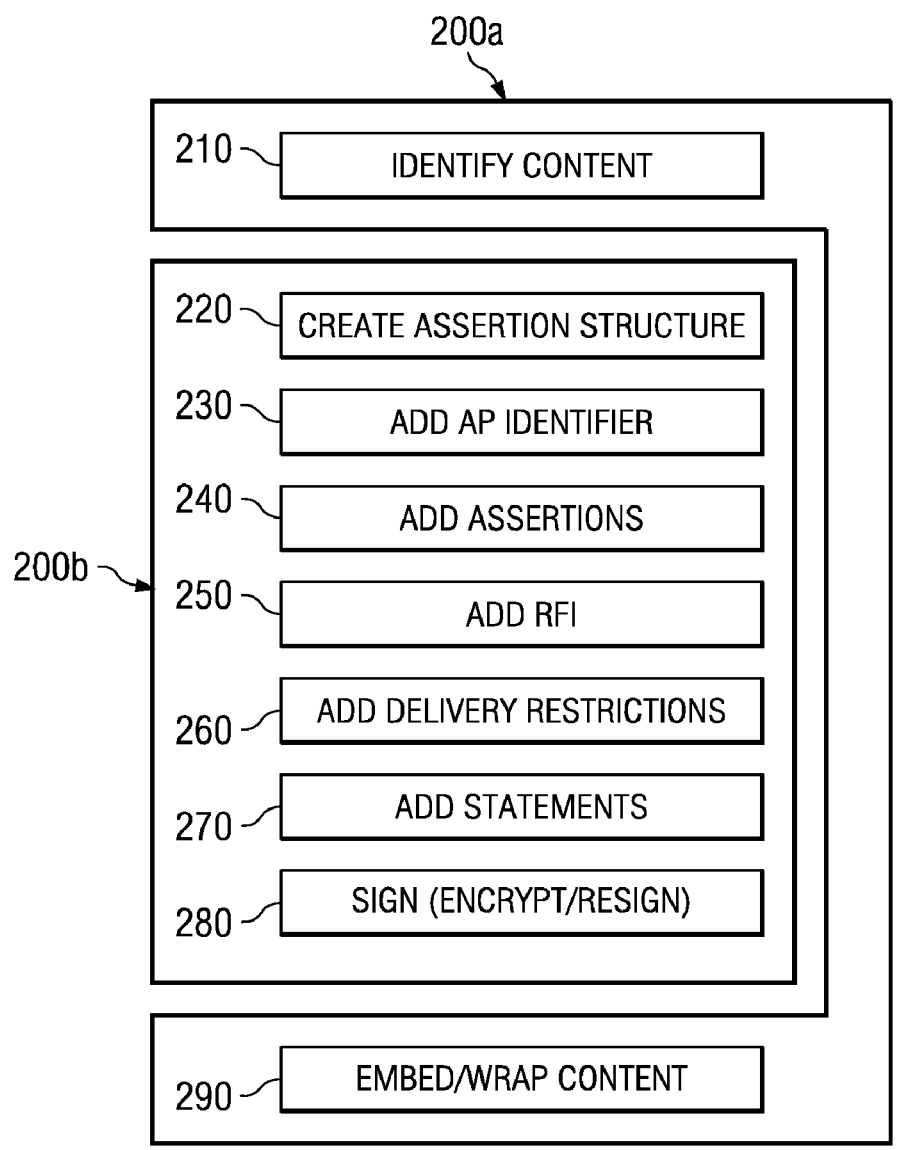
FIG. 2 is a flowchart illustrating a content binding and signing procedure in accordance with one embodiment.

Turning briefly to FIG. 2, a flowchart illustrating one embodiment of a content binding and signing procedure is provided. This flowchart is divided into two phases: content binding 200a and signing 200b. In this embodiment, the difference between bound and unbound assertions is that unbound assertions only go through the steps identified within the box labeled 200b. Subsequent evaluation and verification of the content is possible by following the provided steps in reverse.

Step 210 is in the content binding phase. At step 210, the specific content to be bound is identified and an unambiguous identifier for the content is provided. If the content to be signed is the entire document, a (URI, hash) can be used to unambiguously identify the document: the URI tells where the document is located logically, and the content stored at that URI can be verified by the hash. If the content to be bound is some smaller portion of the document, the tuple is extended to (URI, hash, content identifier, content hash), where the content identifier is a digital extent, XPATH or XQUERY expression, binary delta, or some other means of identifying a portion of the document, and the content hash is a hash of the identified portion. Alternatively, a token necessary for a unique retrieval or delivery mechanism can be bound. Binding on a delivery token and including delivery restrictions that restrict the validity of the reputation to the specified and bound method allows the content to change without the reputation having to be reissued.

Step 220 moves out of the content binding phase and into the signing phase. At step 220, the assertion data structure is created. This assertion data structure may be defined at a binary level as a struct, class, or other construct, or it may be defined at a higher level in a binary, ASCII, or text construct. This flowchart will be described relative to an embodiment in which the data is XML-formatted; an ontology defining the relationships between the different fields is maintained in a DTD, XML Schema, or RelaxNG document. Therefore, to create the assertion data structure an XML document is created, either in memory or on disk, which conforms to the schema or DTD. Because not every section discussed below is necessary, this embodiment creates a minimal validating assertion document and adds child members incrementally.

At step 230, the AP's identifier is added to the assertion data structure. The AP's identifier can be a URI, the AP's name, the AP's public key, or other identifying information. This identifier can be relatively arbitrary; for example, one AP identifier is an encoded binary representation of a person's signature. Referring to the present embodiment, an encoded identifier is appended as the first child element of an <entity> in the assertion data structure, with the identifier type and encoding communicated as attributes of an <identifier> tag, and the actual identifier within a CDATA field.

At step 240, the assertions are added to the assertion data structure. As discussed above, these assertions may be free-form or complex. Complex assertions and assertions not within an XML format are base-64 encoded and put within a CDATA field under an <assertion> tag. Simpler structured entities are encoded using the same serialization rules as XML-RPC and placed under a parent <assertion> tag. Free-form assertions are placed within a CDATA field.

Steps 250-270 are similar: step 250 optionally adds RFI to the assertion data structure; step 260 optionally adds delivery restrictions to the assertion data structure; and step 270 optionally adds other information to the assertion data structure. Each one of these steps is handled similarly to the assertions, except that the relevant top-level tags are <reputation>, <restriction>, and <statement>, respectively.

Step 280 is the last step in the signing phase. In step 280, the assertion data structure is signed and optionally encrypted. In this embodiment, <signature> tag comes last in the assertion data structure; all previous tags and their contents are signed and the signature is put under the <signature> tag. In embodiments in which the assertion needs to be encrypted, the assertion data structure is signed as described above and the whole document, including the signature is encrypted. The encrypted data is then wrapped in another top-level <assertion> tag with two children: an <encrypted> tag containing a base-64 representation of the encrypted data, and a <signature> tag signing all the <encrypted> content.

Step 290 moves back into the content binding phase. After the signed assertion has been generated as described above, the assertion is associated with the identified content. For convenience, this can be broken down into an embedding model and a wrapping model.

In embodiments in which the signed assertions are embedded in a larger piece of content, the signed assertion is placed next to the bound content within the larger document or corpus. The content identifier tuple from step 210 is then extended with (assertion identifier, asserted document hash) fields. The assertion identifier is similar to the content identifier, but identifies where within the larger document or corpus the signed assertion is located. The asserted document hash is the hash of the entire document or corpus after the signed assertion has been embedded.

In embodiments in which the signed assertions wrap the content, the original content is wholly embedded within the assertion. For example, one embodiment puts a fixed-length header in front of the content which specifies the start of the content, the content length, the start of the assertion, the assertion length, and a hash of the header. Those skilled in the art will notice that subsequent wrappings either envelope both the asserted and bound content, or they can be parallel, referencing only the same embedded content.

Figure 3:
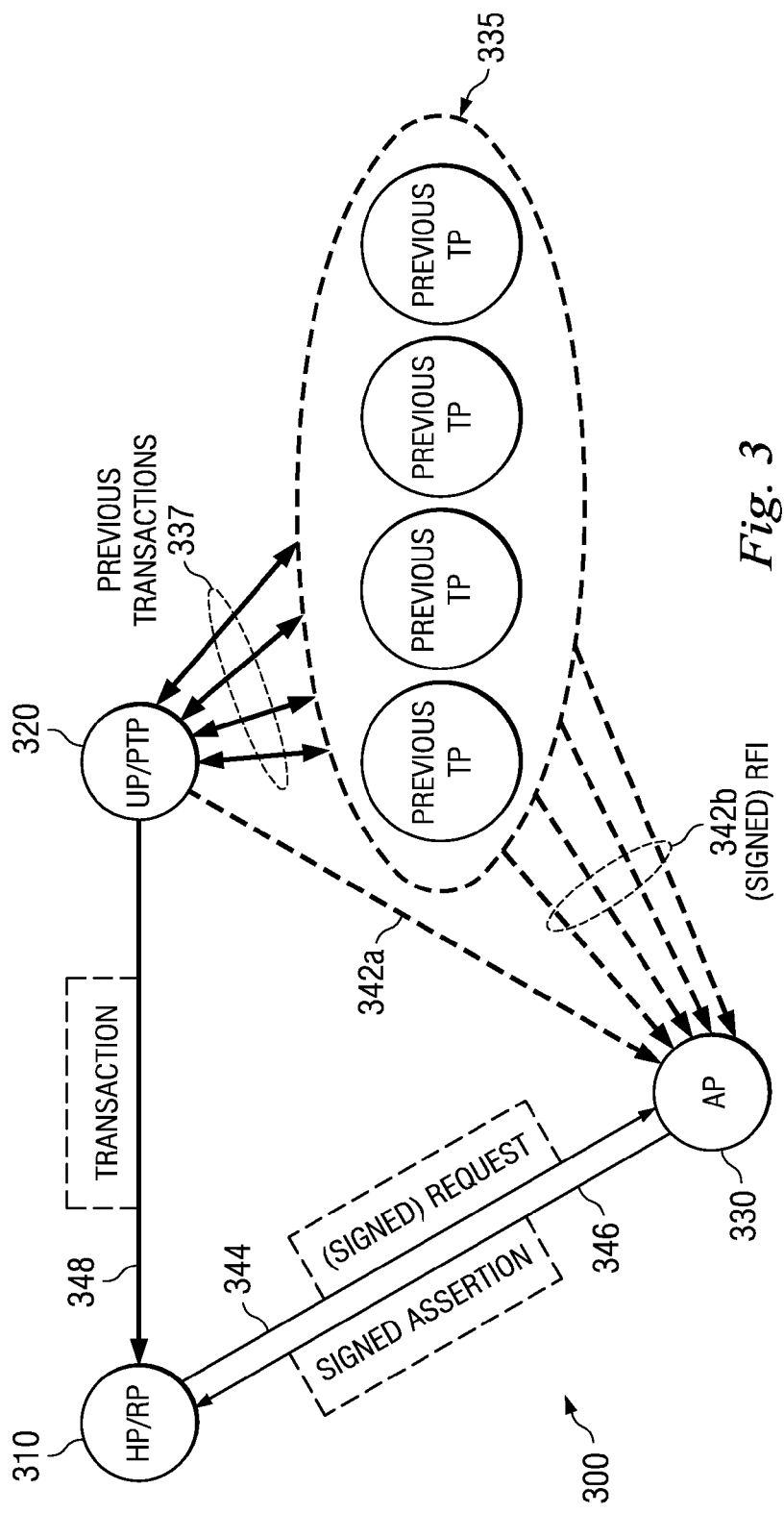
FIG. 3 is a diagram of a signed assertion system in accordance with another embodiment.

FIG. 3 illustrates a model reputation cycle 300 in accordance with an alternative embodiment. As shown in FIG. 3, two entities 310 and 320 are collectively TPs and start out as an HP and a UP, respectively. In this embodiment, the UP 320 has had previous transactions with other parties, referred to herein as previous TPs 335, as represented by arrows 337. Both the previous TPs 335 as well as the UP 320 can provide (optionally signed) RFI to the third party AP 330, as represented by arrows 342a, 342b. The entities 310, 320, 330, can then continue the reputation cycle as described previously. In particular, the HP 310 makes an (optionally signed) request for an assertion, as represented by an arrow 344, which the AP 330 signs and provides, as represented by an arrow 346. The HP 310 and UP 320 become an RP and a PTP, respectively, and continue with the transaction using the assertion as an input, as represented by an arrow 348.

The use of multiple sources of RFI in FIG. 3 has several possible effects. First, the use of RFI from multiple sources serves to put a particular assertion in context. A reputation exists in the context of a community, and the penalty for making false claims, giving unjustified ratings, or giving false endorsements can vary from community to community. In one embodiment, an RFI-source-weighting model is used that takes into account the sources of RFI and implicit or explicit knowledge about the structure of the RFI-providing community.

Second, an RP may have higher confidence in assertions that are generated using more sources of RFI. Because repeated behavior is one possible cue about future conduct, consistent RFI from multiple parties can be relevant to proposed transactions. In one embodiment, a weighting system is used during evaluation to make quantitative and qualitative judgments about the confidence generated by certain assertions, based in part on the number of times fourth parties give consistent RFI to the AP 330. Alternatively, multiple transactions in the past, even with the same entity, may give rise to different amounts of confidence about different assertions.

Third, RFI generated by fourth parties, such as the previous TPs 335, may use "confidence chaining" such that it can be used as a surrogate assertion. In one embodiment, for example, an HP may become an RP based not on the assertion of the evident asserting party, but rather on the assertion of someone farther up the chain of RFI. These fourth-party sources of RFI do not necessarily have to be connected with the UP 320. In another embodiment, for example, the AP 330 is not known to the HP. However, the AP 330 itself uses a fourth party credentialing authority to certify its signature. The HP can become an RP based upon its confidence in the fourth-party credentialing authority. In cases in which there is no information directly provided by the UP, the AP itself can provide the content binding about the third party UP.

Figure 4:
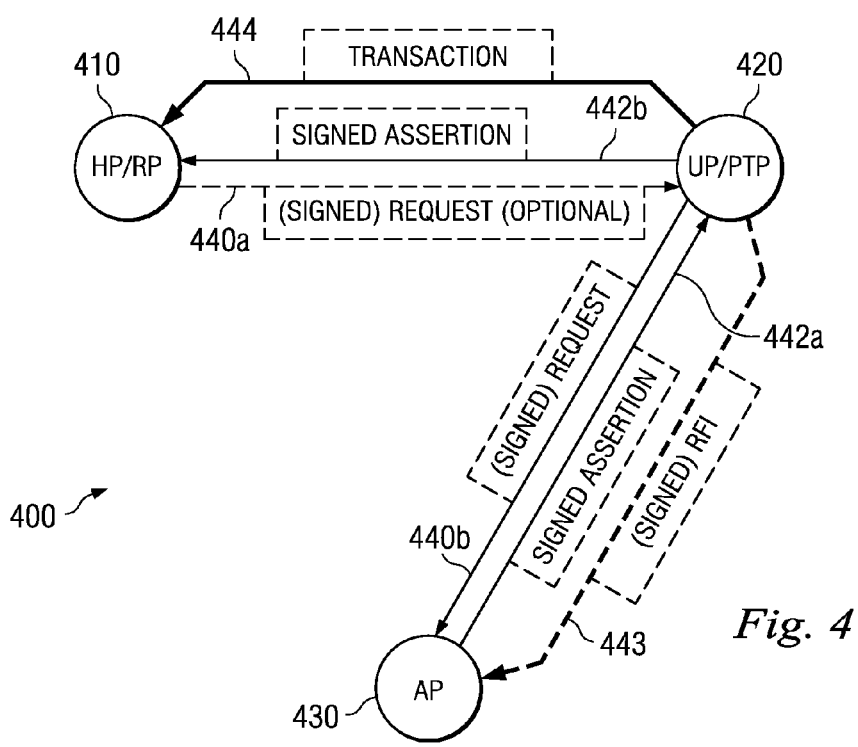
FIG. 4 is a diagram of a signed assertion system in accordance with yet another embodiment.

FIG. 4 illustrates a model reputation cycle 400 in accordance with yet another embodiment. Entities 410 and 420 are collectively TPs and start out as an HP and a UP, respectively. In the cycle 400, however, the UP 420 acts as the requester, requesting and receiving a signed assertion from the AP 430, as represented by arrows 440b and 442a. The request 440b may be made as a result of an optional request 440a from the HP, or the UP may make the request 440b on its own behalf. The UP provides RFI to the AP, as represented by an arrow 443. After some possible storage time, the signed assertion is forwarded to the HP 410, as represented by an arrow 442b, in the context of the transaction. Once again, the provision of the signed assertion 442b may occur as the result of an optional request 440a or the UP may provide the signed assertion without prior prompting from the HP. Assuming the assertion is accepted, HP and UP become RPs and PTPs, respectively, and the transaction continues using the assertion as an input, as represented by an arrow 444.

The content binding and delivery restrictions described earlier allow reputation information to pass safely through multiple hands before the assertions are received by the HP. Continuing with the embodiment described by FIG. 4, the assertions pass through the hands of the UP before they are sent to the HP. However, the UP is untrusted, and it may be in the UP's interest to modify the assertions before they get to the HP. For example, a prospective borrower would like having a credit score of 800 delivered to a lending institution regardless of the borrower's actual credit rating. The credit reporting agency can prevent the theft of credit rating assertions by binding the credit score with a particular piece of content, such as a text representation of the score and information identifying the person to whom the score pertains. The reporting agency can further guard against forgery of credit rating assertions by signing the data, preventing the modification of the score during transit or by including delivery restrictions that require that the score be verified after receipt. Alternatively, the lending institution may require equivalent bindings and delivery restrictions before the score is "trusted" enough to convert the HP lender into an RP.

Particular embodiments of signed assertion systems have advantages that may not immediately be apparent. For example, one issue raised by the storage of assertions, such as illustrated by the possible storage of the assertion in FIG. 3, is the possibility of assertions becoming stale. Some types of reputation information can be dynamic over time. For example, information about the current status of a particular individual is inherently time-limited; it does less good to know about a person's status at some arbitrary point in the past than to know about that person's status right now. Stale reputation information about a time-varying attribute can be harmful, not just unhelpful. For example, many scams cause the most damage during the time during the period when information is stale; i.e., when the reputation information associated with a particular person is no longer good, but before the information associated with that person has been updated.

In one embodiment, the risk of stale information is mitigated by embedding time limits and verification procedures within the signed data. An evaluation module is programmed to respect the time limits and follow the procedures when the assertion is received. For example, one embodiment includes an assertion with a very low or nonexistent non-verified lifetime embedded with the content. When an HP receives the assertion, the embedded verification procedure includes a URI and information about the assertion that must be posted to that URI. The HP initiates a contact with the third party AP and makes an optionally signed request for assurance from the AP that the assertion is still good. The HP evaluates the assertion after the assurance is received, guaranteeing that the assertion is not stale. The HP then becomes an RP when the assertion is interpreted and deemed acceptable.

An advantage of some other embodiments is the use of multiple signing authorities, with varying levels of granularity. Depending on the scope of the assertion, the relevant "content" can refer to a corpus of documents, a single document, or individual parts of a document. Thus, a single "document," itself a piece of "content" for some purposes, can itself have several different subsidiary pieces of "content," each bearing one or more signatures from different signing authorities. For example, a resume is conceptually a single document, but it can be broken down into a number of smaller pieces of content, each piece of content embodying a separate assertion. Assume a resume made by a particular job seeker, John Q. Public. One piece of content contained within this resume is the statement "M.B.A., 2006, XYZ Business School." Associated with this content is an assertion that John attended and graduated from the XYZ school. Another piece of content is the statement "Associate, Marketing Corp, 2003-2006." This content is associated with another assertion, that John was an associate at Marketing Corp. during the time indicated. For each assertion and piece of content, a different signer is desirable. In other words, a person interested in the resume would want to have the "M.B.A." assertion signed by XYZ Business School and the "Associate" assertion signed by Marketing Corp. The resume may be delivered over an encrypted connection, with the encryption embedding further signatures or content guarantees. An evaluation module can modify the presentation of the resume based upon the observed compliance with the content or delivery guarantees.

One embodiment uses a certification chain to implement the confidence-chaining model mentioned above. Continuing the resume example, assume that someone reviewing John's resume is not familiar with XYZ Business School. In one embodiment, however, the assertion could itself be signed by another party, such as a known national graduate school certification authority. Alternatively, the graduate school certification authority could be a key provider. Either way, the reviewer could accept an assertion by allowing confidence to flow transitively from the known national graduate school certification authority to the XYZ business school. In a third alternative, XYZ business school could provide some data that is chained to the certification authority—such as attendance, graduation, and GPA—and other information that is signed by the business school, such as participation in school extra-curricular groups.

It is appreciated that a piece of content that does not meet all the delivery restrictions may still have value. Continuing the resume example, either John or some other AP may want John's "official" resume to have certain delivery guarantees. For example, an "official" resume may need to be delivered over SSL from a certain URL. However, an "unofficial," non-validating copy of the resume could be freely shared with prospective employers. The unofficial resume could include instructions for retrieving and validating the official resume.

One embodiment associates each assertion with its own signature by tightly binding a particular piece of content with a signature. For example, a piece of content is associated with a content specifier such as a digital extent, query, or XPATH expression. The identified content as well as the specifier are included as inputs to the signature function. The resulting signature can be used not only to support the associated assertion but to cryptographically verify the particular piece of content associated with that assertion. Multiple pieces of content, including multiple signatures, can be aggregated and signed as well, up to content signatures covering the entire document. In the resume example, one embodiment allows a private search firm to aggregate and sign the parts of John's resume that have been verified by that firm.

It is appreciated that the content bound to the assertion need not have a necessary connection to the content of the assertion or to the delivery restrictions placed on the assertion. In one embodiment, a web store embeds reliability and good-business-practices assertions from the Better Business Bureau with each page sent out via HTTP. This can be an attested reputation with delivery restrictions and a loose binding specifying that the reputation only applies to content delivered from the web store, with an ontology for business merchant practices. However, individual pages of the web store may include other assertions. For example, a page selling mouthwash can embed an assertion from the American Dental Association. This can be an attested reputation with no delivery restrictions with an ontology for health claims. A third page selling DKNY merchandise contains an attested reputation signed by Donna Karen, asserting that the seller is an authorized dealer. The customer's browser evaluates the assertions and changes the user interface to indicate that only "authorized" merchandise is being sold on this particular page. Therefore, a customer can search for stores and evaluate product offerings based upon many different assertions simultaneously: unbound assertions (e.g., regarding the efficacy of mouthwash); on site-wide assertions (e.g., about the business practices of the store); and on product-specific assertions (e.g., on the authorization of the seller to provide certain products).

The mechanism for embedding and presenting additional information and assertions varies between embodiments. In one embodiment, an XML schema is defined specifying assertions that have meaning within a particular context. For example, one schema for use in finance defines mechanisms for specifying credit levels, balances, liabilities, assets, and other financial information. Part of the information bound into the signed content is an XML fragment conforming to that schema. Those who receive the information are able to understand precisely the quality of the assertion by making reference to the available definitions. In another embodiment, simple strings are bound to the content signature. These strings are free-form, allowing a wide variety of qualitative information to be bound, signed, and associated with content. It is appreciated that one or more ontologies may be used to impart semantic meaning to various pieces of information provided by the AP.

One advantage found in some embodiments relates to the opacity or transparency of the RFI. For example, it would be valuable for a consumer about to enter a transaction with a firm to know the number of recent complaints about that firm to the Better Business Bureau, the prevalence of chargebacks through the credit card company, and the results of the most recent security audit at the firm. However, these and similar internal details of a firm's operation are likely to be considered trade secrets. In another example, it could be valuable to a company to know the creditworthiness of a job applicant. However, most applicants would likely be uncomfortable or unwilling to let employers see so deeply into personal details. In both of these examples, a certification from a third party could attest to the desired behavior without exposing confidential details. One embodiment uses signed assertions to make assurances about data without revealing the actual data to the HP/RP. For example, a credit card company could sign an assertion indicating that the business was operating within standard parameters with regard to chargebacks, complaints, etc. The credit bureau could sign an assertion that a particular individual had a high credit rating, etc. This embodiment allows the UP to reveal the existence of some credential (low chargebacks or high credit) without revealing the underlying data giving rise to the credential.

Other situations may call for greater transparency of data as opposed to greater opacity. The use of signed but transparent assertions allows parties to reinterpret information in a new way. For example, one embodiment allows educational institutions to sign an assertion about a received degree with a variety of additional information. Returning to the resume example, the XYZ business school signs an assertion regarding John's graduation from the school. However, it is possible to embed other information in the signed assertion, such as the degree received, the class rank, GPA, and other honors or awards received. The signed assertion is then embedded in or associated with the resume. Two companies evaluating the John's resume can use the information embedded in the signature to create individual strength-of-assertion models, sorting or classifying the student in arbitrarily different ways based upon subjective judgments of confidence or the value of individual assertions. In another embodiment, not every possible piece of data is included; rather, only a reference to the full data (for example, a URI) is bound with the content.

Another embodiment evaluates signed assertions as predicates in an automated or semi-automated decision process. Reputation assertions are already used as predicates in decision processes. For example, people make judgments about who they will buy from on eBay based upon a user's feedback score. However, these judgments are subjective on the part of users and prone to mistakes. In fact, a substantial criminal industry has built up around the practice of "phishing;" that is, using counterfeit sites to steal personal information. However, some embodiments can make these predicates more reliable or more confidence-generating by using signed assertions.

In one exemplary embodiment, a reputation provider tracks phishing attempts by setting up several "spamtraps" (email boxes designed to receive large amounts of "spam," or unsolicited commercial email). When a phishing attempt is located in an email message, the information in the message is captured as RFI. When a browser or email client then receives a similar phishing attempt, the reputation provider sends a signed assertion to the browser or email client. The client software can then display a visual warning, automatically redirect the phishing attempt, or otherwise act to mitigate the risk. Thus the bad reputation of the phishing site itself serves to warn possible victims. The phishing site can try to overcome this obstacle by not providing any reputation data at all, but then the lack of reputation data functions as a trigger.

A second embodiment allows "good" messages to get through in spite of a domain with a bad reputation. For example, a large amount of spam is routed through the free email-accounts at major webmail providers like Hotmail and Yahoo! Mail. As a result, the domains associated with free email providers frequently have negative reputations. One embodiment embedded into an email filtering system evaluates signed assertions within an email to determine if some part of the content of the email has been signed by a trusted AP. The existence of provisionally trusted content within an email from a suspect domain allows more flexibility and confidence in anti-spam schemes.

A third embodiment allows a single web page or email to be marked according to the assertions contained within that document. A list of trusted reputation providers is maintained within a client software package. Different pieces of signed content within the same package are then evaluated against the list of trusted reputation providers. The document is then marked with metadata about which parts of the content are trusted. In one embodiment, the metadata takes the form of color overlays. Content signed by a trusted provider is overlaid in green, content signed by an unknown provider is overlaid in yellow, and unsigned content or content signed by a known untrusted provider is overlaid in red. Alternatively, assertion content is displayed in one window, and in-line content is displayed in another. The ability to separate the "in-band" content from the "out-of-band" assertions allows for information presentation in a form other than that originally contemplated by the UP/PTP. Because it is much more difficult to spoof out-of-band data, the information provided out-of-band is a good check on the in-band data.

In a fourth embodiment, the information is passed to a digital "wallet" containing credit card and other personal information. This wallet is used, for example, to allow minor children to use a parent's information to make purchases without disclosing that information to the children. The wallet contains instructions that prevent the release of information if the web site asking for the information does not accompany the request with a reputation assertion signed by a trusted reputation provider. The wallet evaluates the signatures associated with the request and then grants or denies access accordingly.

A further embodiment allows for the creation of reputation markets. As noted above, some reputation systems already exist. However, the nature of these reputation systems is such that it is difficult or impossible to make the reputation "portable" to new locations. For example, eBay has a reputation system driven by its users. However, there are no security properties or guarantees associated with the numerical eBay ranking. Therefore, a seller with a good reputation on eBay has no way to leverage that reputation to make sales on another site like Amazon.com; an HP is unlikely to accept the assertion "I have a good reputation as user [username] on eBay" because there is no easy way to make sure that the person associated with any particular eBay user is the same as the present UP. One embodiment allows a site with reputation information to become a reputation provider by publishing signed assertions. For example, assume a business, Widget Corp. ("Widget"), which has historically done business on the online site "Online.com" as "widgetseller." Further assume that Online maintains a reputation system—RFI—by tracking the transactions of its users. In one embodiment, Widget pays Online to sign an assertion that Widget has a particular reputation ranking on Online.com. Online does so, binding this assertion to a cryptographic token provided by Widget. Further restrictions can also be placed on the assertion. For example, Online can restrict the URI from which the assertion must be served to be valid, or Widget can specify delivery via an encrypted transmission stream. When an HP, "User," wants to do business with Widget (the UP), User makes a signed request to the AP Online. Online responds with the signed assertion. Because the assertion was signed by Online, and bound to Widget's token, User can use the signatures to verify 1) that Online made an assertion about the holder of a particular token, which is provably Widget, and 2) Online asserted knowledge of Widget's reputation on Online.com. While the assertion may not be enough to change Widget into a trusted party, it is sufficient to make Widget a PTP. User changes from an HP to an RP and continues with the transaction, at which point Online captures part of the transaction as a fee for providing reputation services. Online also optionally captures information from the transaction and uses it to modify the reputation on Online.com. In a second embodiment, Online can act as a reputation assertion provider for Widget. For example, Online receives delivery restrictions from Widget, adds RFI and its own delivery restrictions, signs it all, and sends it back to Widget for use in online commerce. Widget benefits by having signed RFI available, provably provided by and asserted by a third party. Online is paid for providing the service.

Those skilled in the art will appreciate that different assertions can carry varying guarantees about the quality or veracity of particular pieces of content. Different parties in the transaction may participate in a reputation market by providing different assertion services for a fee. In one embodiment, for example, assertions are guaranteed by their respective APs, optionally providing indemnification in case the signed piece of content is false. For example, a bank can provide guarantees about the contents of a particular applicant's account in the context of a mortgage application. In the event that the assertions about the applicant's account are false, the financial institution could be liable for the resulting damages. The bank can charge the customer a fee for providing the assertion; the customer can use the assertion to lower his risk profile with a lender to win more favorable interest rates.

In another embodiment, the AP asserts that the UP has posted a bond or provided insurance regarding an assertion. For example, a contractor bidding on a project could pay an extra fee to include an assertion from the state or from the bond maker verifying his or her "bonded" status. In this example, the state or bond maker would not be liable for any deficiencies in the contractor's performance, but the existence of the assertion could reduce the potential risk for parties employing the contractor.

In a third embodiment, the AP only asserts some qualitative "knowledge and belief" or another non-binding information in association with a particular piece of content. For example, assume that John Q. Public's resume includes assertions bound to each entry in a list of references. One reference may only embed the assertion "I am willing to be a reference for John Q. Public." Another reference may embed the assertion "I have found John Q. Public to be honest in his dealings." A third reference may embed only a "Positive," "Negative," or "Neutral" rating. These statements are not actionable in any real sense, but they provide important context within HP-UP dealings.

It is appreciated that even simple assertions can be more valuable when they are signed by a particular identity. For example, one popular scam on online auction sites builds up an apparent "reputation" by engaging in transactions between a number of different shell accounts. After this "reputation" is established, the scammer engages in a number of simultaneous high-value transactions. After collecting the money, all the shell accounts are abandoned.

By way of contrast, one embodiment associating RFI with signed assertions makes this sort of scam more difficult or even impossible, depending on the guarantees associated with each assertion. Because reputation, including RFI, is rooted in identity, it is more difficult to use shell accounts to build up false reputation in a community. In one embodiment, each transaction evaluation (the RFI) also comprises a signed assertion concerning the source of the RFI. Prospective buyers and sellers could weight a reputation based upon various models, such as a web-of-confidence model, a community-connectedness model, individual strength-of-assertion models, etc.

A further embodiment uses signed assertions from parties outside the market to strengthen assertions. For example, a bank and a merchant association could each provide signed assertions about an UP. The bank assertion could be opaque, simply asserting that the bank affirms the identity information given and asserts that there are assets in the bank associated with that person. The merchant group could be transparent, asserting particulars about the merchant's transaction history. The online seller could then aggregate this information into its own assertion about a particular participant in the marketplace. In this fashion, very good reputation information can be conveyed from multiple APs to an HP without compromising the security or integrity of the UP's personal information and account details.

A variation on the reputation market is provided by another embodiment. Individuals or other entities are allowed to publish signed lists of preferences, thus becoming reputation providers. Consumers of reputation information are able to selectively include people in their list of acceptable reputation providers. For example, one embodiment allows people to advertise their own expertise in some field by publishing signed preferences. One embodiment allows the publication of stock market picks; another allows the publication of fantasy football trades; a third allows the publication of favorite books. One embodiment allows the automated creation of personalized "pick lists" based upon assertions from a selected list of reputation providers. In this model, the HP is the reputation consumer, the UP is the prospective pick, and the AP is the trusted reputation provider. In an embodiment providing stock market guidance, each ticker symbol is a prospective TP. For each ticker symbol, a request is made to one or more APs concerning that symbol. Individual results or custom composite results are assembled from the signed assertions returned. In one embodiment, the information is as simple as a buy/hold/sell recommendation; in another embodiment the signed assertion includes complex information such as the current P/E ratio, recent moves, and trading volume. The HP uses this information to become an RP, buying or selling certain stocks on the basis of the recommendations. The use of signed assertions allows individuals to become reputation providers on the same basis as commercial brokerages, while avoiding spurious inputs like "pump and dump" schemes.

Those skilled in the art will note that there are no inherent limitations concerning who may gather or publish reputation data about a particular UP. The UP/PTPs can choose to which APs they provide RFI or delivery restrictions and from whom they solicit signed assertions. There is no reason why other prospective APs cannot provide alternative signed assertions. Further, HPs do not have to accept the APs or the assertions provided by or at the behest of the UP; they are allowed to use their own APs and weighting systems when they decide how to factor reputation information into a transaction. Thus multiple APs compete in the market to be reputation signers, providers, or both.

In one embodiment, an AP chooses to publish assertions in order to gain commercial advantage in the reputation market. For example, a consumer review and advocacy organization could refuse to have its assertions bound with manufacturer content to demonstrate its independence from the manufacturing organization. The AP can bind the reputation with delivery restrictions so that that only the information from its own site is authoritative. Further, the AP can sell the rights to be included as an authorized distributor under the delivery restrictions so that only its partners can distribute a fully-validating attested reputation.

In another embodiment of the reputation market, assertions are provided for indexing or searching. The indexing organization charges for inclusion in the search engine, for searching, or both. For example, a job-search site could allow job seekers to provide reputation information that is indexed by the site. The job-search site could then charge prospective employers to search or sort the reputation data. Even if the reputation data is provided in such a way that it isn't valid until it is bound with the correct content, just knowing of the existence of the reputation data is valuable.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

What is claimed is:

1. A computer-implemented method comprising:
providing a processor capable of manipulating electrical signals;
providing a network interface, the network interface including a physical or wireless connection to a network;
receiving a request via the network interface to generate a signed assertion relating to a piece of content;
using an executable reputation statement generation process to create a reputation statement concerning a known entity from reputation-forming information (RFI) associated with the known entity, the reputation statement relating to a quality or characteristic of the known entity;
generating by a different entity a signed assertion from the reputation statement and the piece of content, the generating comprising embedding the piece of content and the reputation statement with an assertion and signing a portion of the assertion comprising at least one of the embedded piece of content and the embedded reputation statement to generate said signed assertion, wherein the generating comprises generating the signed assertion to have a validity that is restricted by one or both of a time restriction and a restriction that limits use of the signed assertion to a predetermined use, and is accomplished by manipulating electrical signals within the processor, and
wherein the signed assertion includes at least a portion of the RFI used to generate the reputation statement and a representation of the executable reputation statement generation process; and
transmitting the signed assertion via the network interface.

2. The method of claim 1 wherein the transmitting the signed assertion via the network interface includes composing an electromagnetic message addressed to the known entity.

3. The method of claim 1 wherein the known entity is one of a product, service, and brand.

4. The method of claim 1 wherein one of the RFI and the signed assertion includes an identity specifier comprising at least one of an authenticated identity, Uniform Resource Identifier ("URI")-based identity, a pseudonymous identity, a revocably anonymous identity, a group identity, a confirmed identity, a cryptographic identity, a possession-based identity, and a biometric-based identity.

5. The method of claim 1 wherein the generating a signed assertion comprises incorporating in said signed assertion one or more of a second signed assertion, a delivery restriction, and a content restriction.

6. The method of claim 1 wherein the RFI comprises RFI from multiple sources.

7. The method of claim 1 wherein a receiving entity evaluates the signed assertion.

8. The method of claim 1 wherein generating the signed assertion comprises incorporating in the signed assertion one of a delivery restriction, a content restriction, a cryptographic procedure, and a verification procedure.

9. The method of claim 1 wherein generating said signed assertion comprises aggregating the embedded piece of content with a second piece of content and a corresponding verified assertion from another entity.

10. The method of claim 9 wherein the second piece of content is embedded with a second reputation statement.

11. The method of claim 10 wherein the verified assertion from said other entity comprises a further signed assertion.

12. A method comprising:
providing a computer system, the computer system including a processor, network interface, storage device, and storage interface;
at a computing module executed by the processor of the computer system, receiving a signed assertion embedded with an associated piece of content and a reputation statement relating to a quality or characteristic of a first entity, the signed assertion being received from the network interface and having a validity that is restricted by one or both of a time restriction and a restriction that limits use of the signed assertion to a predetermined use, wherein the signed assertion presents information associated with the first entity and is signed by a second entity;
wherein the signed assertion includes first data regarding the signature and the embedded content;
evaluating the signed assertion to produce an intermediate result by manipulating electrical signals within the processor, wherein the evaluating includes verifying the signed assertion using the first data;
using the intermediate result in accordance with said restrictions to modify a reputation value associated with the first entity and storing a processor-interpretable representation of the reputation value by inducing a physical state change in the storage device via the storage interface.

13. The method of claim 12 wherein the evaluating the signed assertion is performed using one of an operator-presentation model, a rule-defined interpretation model, a reputation function, a classification function, a web-of-confidence model, a community-connectedness model, an RFI-source-weighting model, and a confidence-chaining model.

14. The method of claim 12 wherein the evaluating the signed assertion further comprises incorporating one of a delivery restriction, a content restriction, a cryptographic procedure, and a verification procedure.

15. The method of claim 12 wherein the embedded piece of content is aggregated with a second piece of content.

16. The method of claim 15 wherein the second piece of content is embedded with a second reputation statement and to a corresponding verified assertion.

17. The method of claim 16 wherein the second reputation statement and corresponding verified assertion are from a verifying entity.

18. A system comprising:

a network coupling first, second, and third processors forming, respectively, first, second and third processing entities, wherein the first processing entity is adapted to:

receive an assertion request specifying a piece of content and an identity specifier associated with the second processing entity;

generate a reputation statement from reputation-forming information (RFI) associated with the second processing entity, wherein the reputation statement relates to a quality or characteristic of the second processing entity and includes a portion of the RFI;

generate a signed assertion by embedding the piece of content with the reputation statement and signing a portion comprising one of the piece of content and the reputation statement, the signed assertion having a validity that is restricted by one or both a time restriction and a use restriction; and transmit the signed assertion; and wherein the third processing entity is adapted to:

receive the signed assertion;

evaluate the signed assertion to produce an intermediate result; and use the intermediate result to modify a reputation value associated with the second processing entity.

19. The system of claim 18 wherein the signed assertion is transmitted via one of a direct transmission, a transmission by way of the second processing entity, and a transmission through a fourth processing entity.

20. The system of claim 18 wherein the RFI is received from multiple sources.

* * * * *